March 5, 1957  A. P. SCHNEIDER  2,783,662
HELIO-CENTRIC SPEED REDUCERS
Filed April 21, 1952  3 Sheets-Sheet 1

INVENTOR.
Albert P. Schneider

March 5, 1957  A. P. SCHNEIDER  2,783,662
HELIO-CENTRIC SPEED REDUCERS

Filed April 21, 1952  3 Sheets-Sheet 2

INVENTOR.
Albert P. Schneider

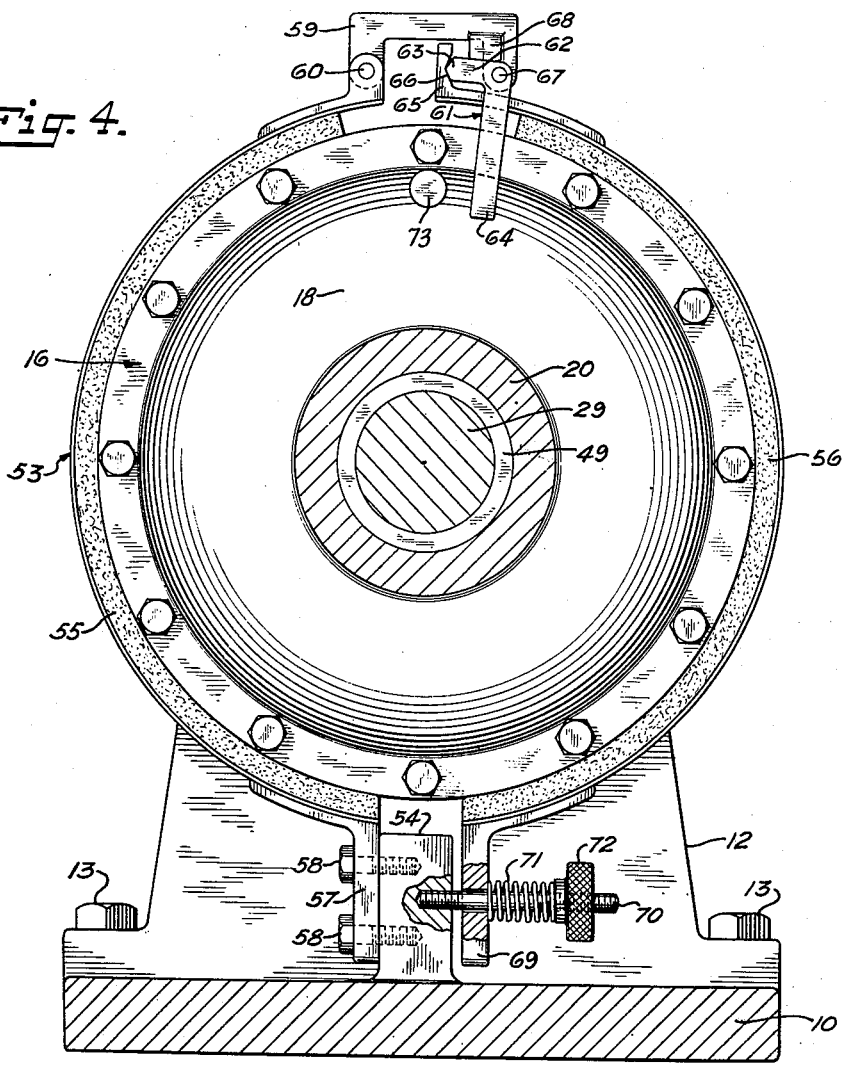
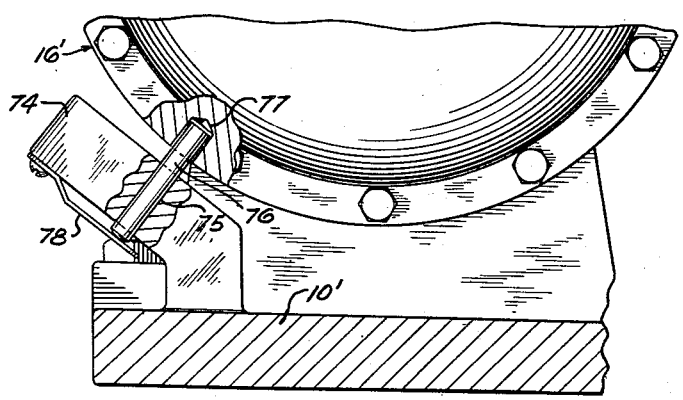
INVENTOR.
Albert P. Schneider

2,783,662

HELIO-CENTRIC SPEED REDUCERS

Albert P. Schneider, Milwaukee, Wis.

Application April 21, 1952, Serial No. 283,393

10 Claims. (Cl. 74—805)

This invention relates to improvements in helio-centric speed reducers.

Helio-centric speed reducers have not won commercial acceptance principally because of their inefficiency. Conventional gear tooth contours are inefficient when used in helio-centric gearing, and an efficient tooth contour for helio-centric gearing has not been heretofore available. Helio-centric gearing has also been subject to noise and vibration which has prevented its use in many applications. In helio-centric gearing having conventional gear teeth a certain amount of power is lost as a result of entrapment of oil between meshing teeth of the planetary and internal ring gears.

It is a primary object of the invention to provide a smoothly operating helio-centric speed reducer of high efficiency in which vibration and noise are eliminated.

Another object of the invention is to provide an improved helio-centric speed reducer employing novel cylindrical tooth contours which are simple to manufacture and which avoid power losses from oil entrapment.

Another object of the invention is to provide an improved helio-centric speed reducer wherein the meshing gears have a smooth acting and efficient roller and sprocket coaction.

Still another object of the invention is to provide an improved helio-centric speed reducer provided with an automatically releasable overload release mechanism which renders the unit inoperative to transmit power after having been subjected to a predetermined overload.

Other objects of the invention will appear from the detailed description.

The invention consists in the several novel features which are hereinafter set forth and more particularly defined by the claims as the conclusion hereof.

In the drawings illustrating the invention, Fig. 1 is a section plan view of a helio-centric speed reducer.

Fig. 4 is a section taken on line IV—IV of Fig. 1.

Fig. 5 is a fragmental view similar to Fig. 4 showing a modified form of the invention.

Figure 1:
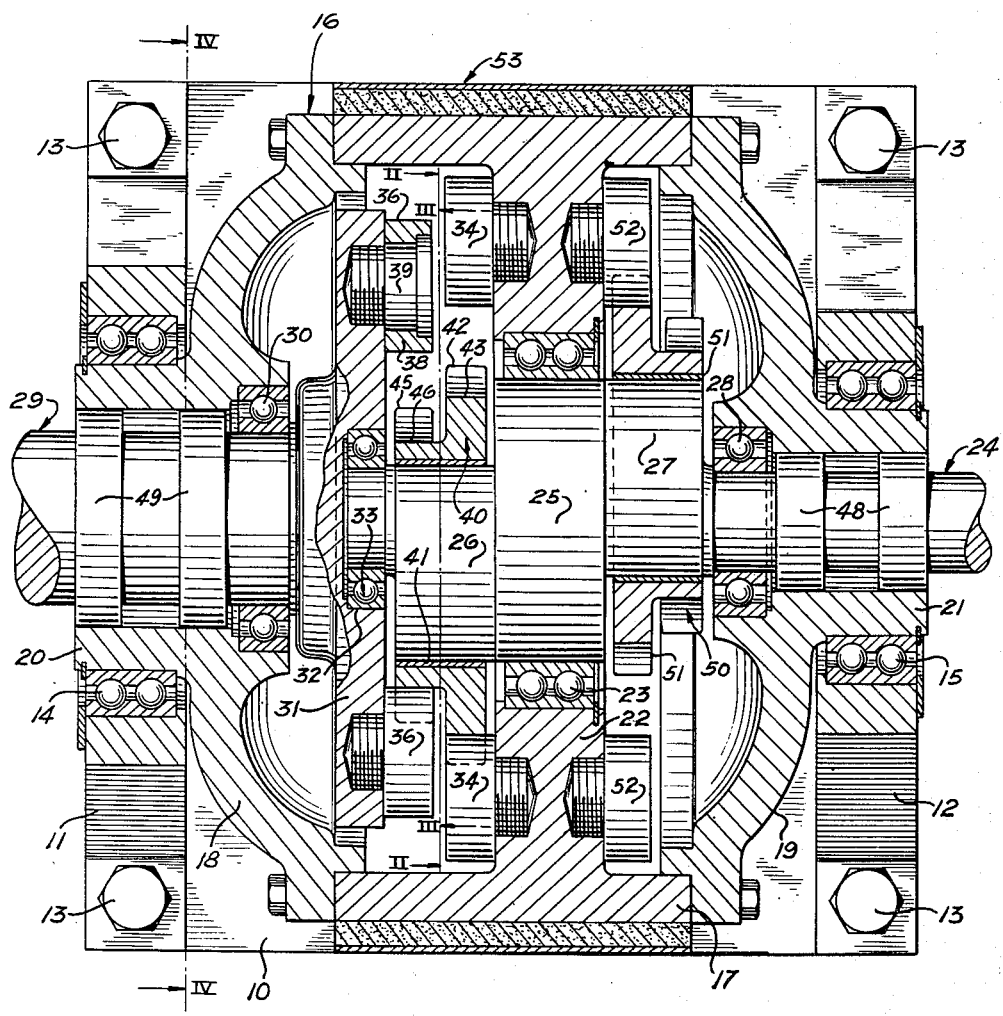

The unit shown in Figs. 1 to 5 as an exemplification of the invention, comprises a base plate 10 having a pair of spaced parallel upright bearing supports 11 and 12 fixed thereto, as by bolts 13. The supports 11 and 12 carry coaxial ball bearing units 14 and 15 respectively.

A case 16 encloses the gearing of the improved speed reducer and is provided with an annular wall 17 and a pair of removable end bells 18 and 19. The end bells 18 and 19 are formed with outwardly directed coaxial tubular bosses 20 and 21 which are journaled respectively in the bearings 14 and 15. The case 16 is normally prevented from rotating in the bearings 14 and 15 by a brake band mechanism 53, which will be described in detail later. The annular wall 17 is formed with an integral radially inwardly directed annular wall 22 which carries a ball bearing unit 23 of relatively large diameter coaxial with the bearings 14 and 15.

A high speed or input shaft 24 is formed with a portion 25 of enlarged diameter, and on opposite sides of the portion 25 said shaft is formed with identical eccentrics 26 and 27 which are angularly offset 180 degrees from one another. The shaft 24 is journaled for rotation in the case 10, the portion 25 being rotatable in the bearing 23, and said shaft also being journaled in a ball bearing 28 mounted in the end bell 19.

A low speed or output shaft 29 is coaxial with the input shaft 24 and is journaled in a ball bearing 30 carried by the end bell 18. The inner end of the shaft 29 is formed with a coaxial circular plate 31 which extends in a plane normal to said shaft. The plate 31 is formed with a coaxial cup-shaped bearing recess 32 on its inner face. A ball bearing 33 is mounted in the recess 32, and the inner end of the input shaft 24 is journaled in the bearing 33 to serve as a pilot.

Figure 2:
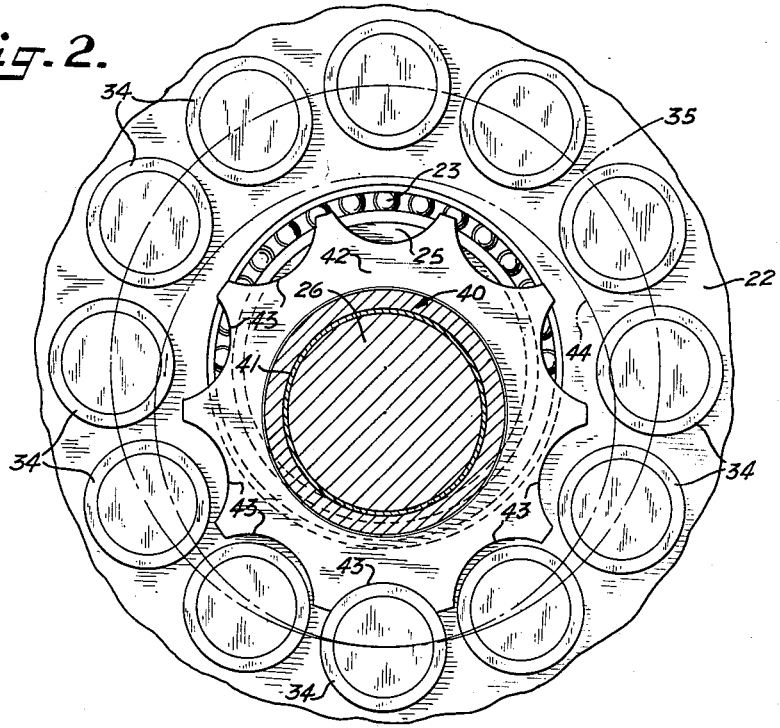
Fig. 2 is a fragmental section taken on line II—II of Fig. 1.
Figure 3:
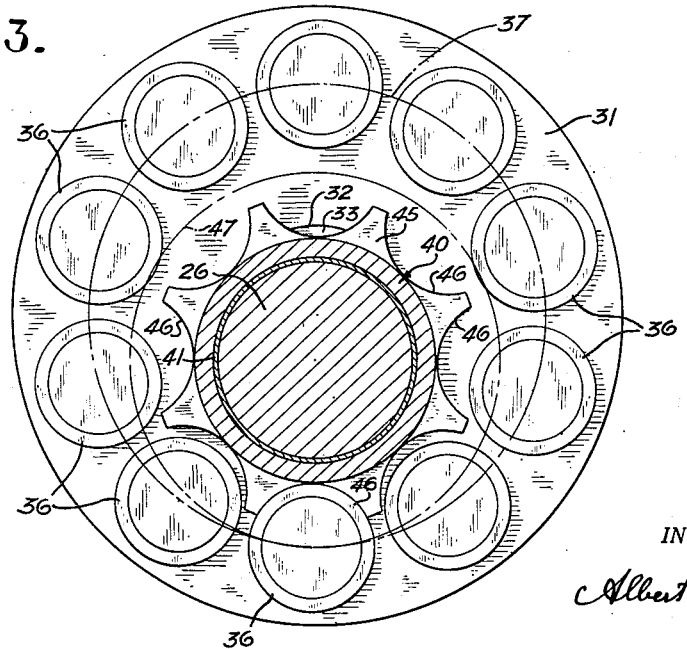
Fig. 3 is a section taken on line III—III of Fig. 1.

As shown in Figs. 1 and 2, a plurality of cylindrical gear teeth 34 are mounted on one side of the annular wall 22 to form a ring gear. The teeth 34 are disposed in equally spaced relationship with their axes on a pitch circle 35 concentric with the shaft 24. In the illustrated embodiment there are 12 teeth 34 (see Fig. 2). Referring to Figs. 1 and 3, a plurality of equally spaced cylindrical teeth 36 are mounted on the inner face of the circular plate 31 to form a ring gear. The teeth 36 have their axes on a pitch circle 37 concentric with the shaft 24. In the illustrated embodiment there are ten teeth 36. As shown in Fig. 1, the cylindrical teeth 34 and 36 may take the form of counterbored cylindrical sleeves 38, each rotatably carried by a flat headed stud 39. The studs 39 are threaded into the member 22 or 31 on which the tooth is mounted.

A ring or sleeve 40 is provided with a bearing sleeve 41 and is journaled on the eccentric 26, so that the ring is rotatable around the axis of, and movable radially by eccentric 26. The ring 40 is provided with a gear 42 which is in the nature of a sprocket. The gear 42 is formed with preferably 10 identical peripheral recesses 43 which are cylindrical in contour. The recesses 43 have their axes located on a pitch circle 44 which is concentric with the eccentric 26, and said axes are spaced apart a distance equal to the spacing between the axes of the teeth 34. As shown in Fig. 2, the diameter of the gear 42 is less than the diameter of the pitch circle 44. The throw of the eccentric 26 is such that the pitch circle 35 is at all times internally tangent to the pitch circle 44, as shown in Fig. 2. The radius of curvature of the recesses 43 is the same as the radius of the cylindrical teeth 34.

Gear 42 and eccentric 26, upon rotation of the latter by and with shaft 24, produce epicycloidal movement of gear 42 and ring 40. The ring gear formed by the teeth 34, together with the gear 42 and eccentric 26 function as a primary speed reduction of the helio-centric type.

The ring 40 is also provided with a gear 45 which is also in the nature of a sprocket. The gear 45 is provided with preferably eight equally spaced identical peripheral recesses 46 which are similar to the recesses 43 and have their axes on a pitch circle 47 concentric with the eccentric 26. The axes of the recesses 46 are spaced apart a distance equal to the spacing between the axes of the teeth 36, and, as shown in Fig. 3, the diameter of the gear 45 is less than the diameter of the pitch circle 47. The throw of the eccentric 26 maintains the pitch circle 47 at all times tangent to the pitch circle 37, as shown in Fig. 3, and the radius of curvature of the recesses 46 is the same as the radius of the teeth 36.

The gear 45 travels epicycloidally with the gear 42 and drives the output shaft 29 through teeth 36 and plate 31. Gear 45 and the ring gear formed by the plate 31 and its cylindrical teeth 36 function as a secondary speed reduction of the unit.

The case 16 is adapted to contain oil for lubricating all of the parts within the case. A pair of oil sealing rings 48 surround the input shaft 24 within the boss 21, and a pair of similar oil sealing rings 49 surround the output shaft 29 within the boss 20.

A ring 50 is provided with a bearing sleeve 51 and is journaled on the eccentric 27. The ring 50 is preferably of the same weight as the ring 40 and counterbalances said ring to eliminate the vibration which would otherwise result from high speed epicycloidal travel of the ring 40. Since the eccentrics 26 and 27 are identical, they also counterbalance each other to avoid vibration.

It will be noted that when a tooth 34 is in mesh with a recess 43 of the gear 42 on ring 40, a support for the shaft 24 is provided through the eccentric 26, ring 40, the meshing tooth 34, and annular wall 22 to the case 10. This is because of the coincidence of the axes of the meshing recess 43 and tooth 34 providing bottoming contact. A rolling support results, which progresses from one tooth 34 to the next as the ring 40 moves epicycloidally during rotation of the shaft 24. A similar rolling shaft supporting relationship is provided by the meshing of recesses 46 of gear 45 with the teeth 36 on the disc 31.

The ring 50 provides for a rolling support between the shaft 24 and case 10 through the eccentric 27. The specific structure to provide this rolling support may take a variety of forms, and in the illustrated embodiment the ring 50 takes the form of a duplicate of the ring 40 mounted in end for end reversed relationship with respect to the ring 40. Twelve teeth 52 identical and coaxial with the teeth 34 are mounted on the opposite side of the wall 22 from the teeth 34 and form a ring gear. The teeth 34 are engaged by the larger gear 53 of the ring 50 in the same manner that the gear 42 engages the teeth 34. As shown clearly in Fig. 1, the rolling shaft support provided through eccentrics 27, ring 50, teeth 52 and wall 22 is diametrically opposite that provided by the ring 40, teeth 34 and wall 22.

The location of the main shaft bearing 23 between the eccentrics 26 and 27, combined with the rolling shaft supports acting through said eccentrics, provides a structure which eliminates any deformation or whipping tendency on the part of the shaft 24 during rotation. In addition, the structure provides a dynamically counterbalanced unit in which the vibratory effect of the epicycloidal movement of the gear 40 is counteracted in every respect by similar epicycloidal movement of the gear 50. The sprocket type planetary gears mesh smoothly with the cylindrical teeth of the ring gears, and meshing friction is substantially reduced, not only by the cylindrical tooth and recess contours, but also by the rotatable mounting of the cylindrical gear teeth. The spacing between the cylindrical teeth permits free flow of oil therebetween, so that all oil entrapment losses are avoided.

Referring to Fig. 4, the base plate 10 may be formed with an upstanding bar 54. The brake band 53 is preferably made in two sections 55 and 56. The lower end of the section 55 is provided with an attachment flange 57 which is fixed to the bar 54 as by cap screws 58. A generally U-shaped member 59 is pivotally connected at one end to the upper end of the section 55, as at 60, and pivotally mounted on the other end of said member, as at 67, is an L-shaped tripping lever 61. Lever 61 has a relatively short arm 62 formed with a chisel-shaped tip 63, as well as a longer arm 64 projecting toward the shaft 29 adjacent the end bell 18.

The upper end of the brake band section 56 is formed with an upstanding flange member 65 formed with a shallow V-groove 66 in its outer surface to receive the tip 63 of the arm 62. The point of contact of the tip 63 with the apex of the groove 66 is positioned slightly above the axis of the pivot 67. The member 59 is formed with an abutment 68 to limit the clockwise movement of the arm 62. The lower end of the band section 56 is provided with an apertured flange member 69 through which projects a stud 70 which is threaded into the bar 54 as shown. A coiled compression spring 71 may surround the stud 70, and a knurled adjustment nut 72 may be threaded on the stud 70, providing means for tightening the band 53 around the case 16 a selected amount.

A projection 73 is fixed to the end bell 18 adjacent the periphery and in a position to engage and trip the lever 64 upon clockwise rotation of the case 16. Rotation of the case rotates the lever 64 in a counterclockwise direction, thus lifting the axis of the pin 67 above the tip 63 of the arm 62 and releasing the sections 55 and 56 with a toggle action.

When the brake band sections 55 and 56 are released, the case 16 is permitted to rotate freely, and thereafter substantially no power can be transmitted to the output shaft 29 through the speed reducer. The brake band mechanism 53 can be set to exert a predetermined resistance to rotation of the case 16, and when this resistance is overcome by torque created by an overload, the case rotates to release the band in the manner described. The brake mechanism remains released until reset. The carrying of overloads is effectively prevented by the improved structure, and it is obvious that by virtue of the releasable brake band mechanism 53 the improved speed reducer affords means for selectively controlling the delivery of power to the driven shaft through said reducer. For example, upon manual release of the brake band mechanism, no substantial power can be transmitted to the output shaft 29 through the speed reducer.

Fig. 5 shows a modified form of the invention wherein a shear pin 76 is employed to prevent rotation of a case 16' similar to the case 16. In this form of the invention the base 10' is formed with an upstanding angled arm 74 which extends adjacent the periphery of the case 16'. The arm 74 is formed with an aperture 75 to slidably receive the shear pin 76. The case 16' is formed with a peripheral cup-shaped recess 77 in which one end of the pin 76 is seated. A leaf spring 78 is pivotally mounted on the outer surface of the arm 74 and holds the pin 76 in the operative position shown. The shear pin 76 is of such size and strength that it normally prevents rotation of the case 16'. When the case 16' exerts above normal torque on the pin 76, said pin shears off, and the case 16' rotates freely to stop substantially all delivery of power to the driven shaft (not shown) of the case 16'. The case 16 continues in released condition until the sheared pin is replaced by a new one. It is obvious that the form of the invention shown in Fig. 5 also effectively prevents operation of the speed reducer under overloaded conditions.

The specific illustrations and corresponding description are used for the purpose of disclosure only, and are not intended to impose any unnecessary limitations on the claims, or to confine the patented invention to a particular use.

Having thus described the invention, what I regard as new and desire to secure by Letters Patent is:

1. In a helio-centric speed reducer: a gear case; a shaft rotatably mounted in said case; a first eccentric formed on said shaft; a ring gear fixed within said case concentric with said shaft; a planetary gear meshing with said ring gear and journaled on said eccentric to be driven thereby; a second eccentric axially offset from said first eccentric and formed on said shaft, said second eccentric being substantially identical with said first eccentric and being angularly offset 180 degrees therefrom; an annular counterbalancing member journaled on said second eccentric, said annular member having a weight substantially the same as said planetary gear; and shoulder means formed on the interior of said case in such a manner that said annular counterbalancing member has a rolling contact therewith during rotation of said shaft.

2. In a helio-centric speed reducer: a gear case; a shaft rotatably mounted in said case; a first eccentric formed on said shaft; a ring gear fixed within said case concentric with said shaft; a planetary gear meshing with said ring gear and journaled on said eccentric to be driven thereby; a second eccentric axially offset from said first eccentric and formed on said shaft, said second eccentric being substantially identical with said first eccentric and being angularly offset 180 degrees therefrom; an annular counterbalancing member journaled on said second eccentric, said annular member having a weight substantially the same as said planetary gear; and shoulder means formed on the interior of said case in such a manner that said annular counterbalancing member has a continuous shaft supporting rolling contact therewith during rotation of said shaft.

3. In a helio-centric speed reducer: a gear case; a shaft rotatably mounted in said case; a first ring gear fixed within said case concentric with said shaft; a first eccentric formed on said shaft within said first ring gear; a first planetary gear journaled on said first eccentric and in shaft supporting meshing contact with said first ring gear; a second ring gear fixed within said case concentric with said shaft and offset axially from said first ring gear; a second eccentric formed on said shaft within said second ring gear, said second eccentric being substantially identical with the first eccentric and angularly offset 180 degrees therefrom; and a counterbalancing planetary gear journaled on said second eccentric and in shaft supporting meshing contact with said second ring gear, said counterbalancing gear being substantially the same weight as said first planetary gear.

4. In a helio-centric speed reducer: a gear case having an internal bearing; a shaft rotatably mounted in said bearing; a first ring gear fixed within said case concentric with said shaft; a first eccentric formed on said shaft within said first ring gear and at one side of said bearing; a first planetary gear journaled on said first eccentric and in shaft supporting meshing contact with said first ring gear; a second ring gear fixed within said case concentric with said shaft; a second eccentric formed on said shaft within said second ring gear and on the other side of said bearing, said second eccentric being substantially identical with the first eccentric and angularly offset 180 degrees therefrom; and a counterbalancing planetary gear journaled on said second eccentric and in shaft supporting meshing contact with said second ring gear, said counterbalancing gear being substantially the same weight as said first planetary gear.

5. In a helio-centric speed reducer: a gear case journaled for rotation and having a coaxial ring gear fixed therewithin; an input shaft mounted in said case for rotation on the axis of said case, said shaft having an eccentric formed thereon; a planetary gear meshing with said ring gear and rotatable on said eccentric; a driven shaft rotatably mounted in said case and drivingly connected to said planetary gear; a brake band normally preventing rotation of said case, said brake band permitting rotation of said case in response to a predetermined torque in said case above normal; release mechanism connected to said brake band; and means on said gear case positioned to actuate said release mechanism in response to rotation of said gear case, release of said brake band permitting free rotation of said gear case to thereby prevent transmission of power to said driven shaft.

6. In a helio-centric speed reducer: a gear case journaled for rotation and having a coaxial ring gear fixed therewithin; an input shaft mounted in said case for rotation on the axis of said case, said shaft having an eccentric formed thereon; a planetary gear meshing with said ring gear and rotatable on said eccentric; a driven shaft rotatably mounted in said case and drivingly connected to said planetary gear; a brake band normally preventing rotation of said case, said brake band permitting rotation of said case in response to a predetermined torque in said case above normal; toggle type release mechanism on said band including a tripping lever; and a projection on said case positioned to actuate said tripping lever in response to rotation of said gear case, actuation of said tripping lever releasing said brake band to permit free rotation of said gear case to thereby prevent transmission of power to said driven shaft.

7. In a helio-centric speed reducer: a gear case; a shaft rotatably mounted in said case; a first eccentric formed on said shaft; a ring gear fixed within said case concentric with said shaft; a planetary gear meshing with said ring gear and journaled on said eccentric to be driven thereby; a second eccentric axially offset from said first eccentric and formed on said shaft, said second eccentric being substantially identical with said first eccentric and being angularly offset 180 degrees therefrom; and an annular counterbalancing member journaled on said second eccentric, said annular member having a weight substantially the same as said planetary gear and being located out of the path of force transmission through said speed reducer.

8. In a helio-centric speed reducer: a gear case; a shaft rotatably mounted in said case; a first eccentric formed on said shaft; a ring gear fixed within said case concentric with said shaft; a planetary gear meshing with said ring gear and journaled on said eccentric to be driven thereby; a second eccentric axially offset from said first eccentric and formed on said shaft, said second eccentric being substantially identical with said first eccentric and being angularly offset 180 degrees therefrom; an annular counterbalancing member journaled on said second eccentric, said annular member having a weight substantially the same as said planetary gear and being located out of the path of force transmission through said speed reducer; and annular means on the interior of said case with which said annular counterbalancing member has a rolling contact during rotation of said shaft.

9. In a helio-centric speed reducer: a gear case; a shaft rotatably mounted in said case; a first eccentric formed on said shaft; a ring gear fixed within said case concentric with said shaft; a planetary gear meshing with said ring gear and journaled on said eccentric to be driven thereby; a second eccentric axially offset from said first eccentric and formed on said shaft, said second eccentric being substantially identical with said first eccentric and being angularly offset 180 degrees therefrom; an annular counterbalancing member journaled on said second eccentric, said annular member having a weight substantially the same as said planetary gear and being located out of the path of force transmission through said speed reducer; and annular means on the interior of said case with which said annular counterbalancing member has a continuous shaft supporting rolling contact during rotation of said shaft.

10. In a helio-centric speed reducer: a gear case journaled for rotation and having a coaxial ring gear fixed therewithin; an input shaft mounted in said case for rotation on the axis of said case, said shaft having an eccentric formed thereon; a planetary gear meshing with said ring gear and rotatable on said eccentric; a driven shaft rotatably mounted in said case and drivingly connected to said planetary gear; a brake band normally preventing rotation of said case, said brake band permitting rotation of said case in response to a predetermined torque in said case above normal; release mechanism connected to said brake band; means on said gear case positioned to actuate said release mechanism in response to rotation of said gear case, release of said brake band permitting free rotation of said gear case to thereby prevent transmission of power to said driven shaft; and means for selectively varying the frictional engagement of said brake band with said case to thereby vary the casing torque required to release said brake band.

References Cited in the file of this patent

UNITED STATES PATENTS

| | | |
|---|---|---|
| 1,192,627 | Hatlee | July 25, 1916 |
| 1,694,031 | Braren | Dec. 4, 1928 |
| 1,978,011 | Carter | Oct. 23, 1934 |
| 2,046,283 | Berlyn | June 30, 1936 |
| 2,408,666 | Mallard | Oct. 1, 1946 |
| 2,666,345 | Amberg | Jan. 19, 1954 |
| 2,677,288 | Gnahrich | May 4, 1954 |

FOREIGN PATENTS

| | | |
|---|---|---|
| 537,465 | France | Mar. 3, 1922 |
| 354,350 | Germany | June 8, 1922 |
| 359,025 | Germany | Apr. 25, 1928 |
| 2,435 | Great Britain | Nov. 1, 1855 |
| 142,829 | Switzerland | Dec. 16, 1930 |